United States Patent [19]

Gobble et al.

[11] 4,178,392

[45] Dec. 11, 1979

[54] METHOD OF MAKING A READY-TO-EAT BREAKFAST CEREAL

[75] Inventors: Harold G. Gobble, Johnstown Township, Barry County; Richard M. Vondell, Battle Creek; Raymond Mooi, Wyoming, all of Mich.

[73] Assignee: Kellogg Company, Battle Creek, Mich.

[21] Appl. No.: 812,341

[22] Filed: Jul. 1, 1977

[51] Int. Cl.² .............................................. A23L 1/164
[52] U.S. Cl. ...................................... 426/96; 426/93; 426/103; 426/285; 426/302; 426/512; 426/620
[58] Field of Search ........................ 426/89, 93, 96, 99, 426/103, 285, 302, 305, 620, 454, 459, 462, 463, 512

[56] References Cited

U.S. PATENT DOCUMENTS

| | | | |
|---|---|---|---|
| 1,409,998 | 3/1922 | Cooley | 426/459 X |
| 1,945,947 | 2/1934 | McKay | 426/99 X |
| 2,339,418 | 1/1944 | McKay | 426/96 X |
| 2,437,150 | 3/1948 | Berg | 426/285 |
| 3,303,796 | 2/1967 | Novissimo | 426/512 |
| 3,431,112 | 3/1969 | Durst | 426/89 |
| 3,582,336 | 6/1971 | Rasmusson | 426/93 |
| 3,876,811 | 4/1975 | Bonner et al. | 426/93 |
| 3,959,498 | 5/1976 | Lyall et al. | 426/93 |
| 3,962,462 | 6/1976 | Burkwall et al. | 426/512 X |
| 4,038,427 | 7/1977 | Martin | 426/93 X |

FOREIGN PATENT DOCUMENTS 1447464  8/1976  United Kingdom ...................... 426/93

Primary Examiner—Raymond N. Jones
Assistant Examiner—Esther M. Kepplinger
Attorney, Agent, or Firm—Gary, Juettner & Pyle

[57] ABSTRACT

A ready-to-eat breakfast cereal product contains coarse particulate vegetable components, sugar components, and shortening, with or without other ingredients, and is substantially free of flour. The ingredients are mixed into a heterogeneous moldable mass, and the mass is die molded to form a plurality of bite sized pieces which are dried to form a crisp structure characterized by a matrix of particulate components coated and adhered together by the sugar and shortening components.

12 Claims, 9 Drawing Figures

U.S. Patent    Dec. 11, 1979    Sheet 1 of 2    4,178,392
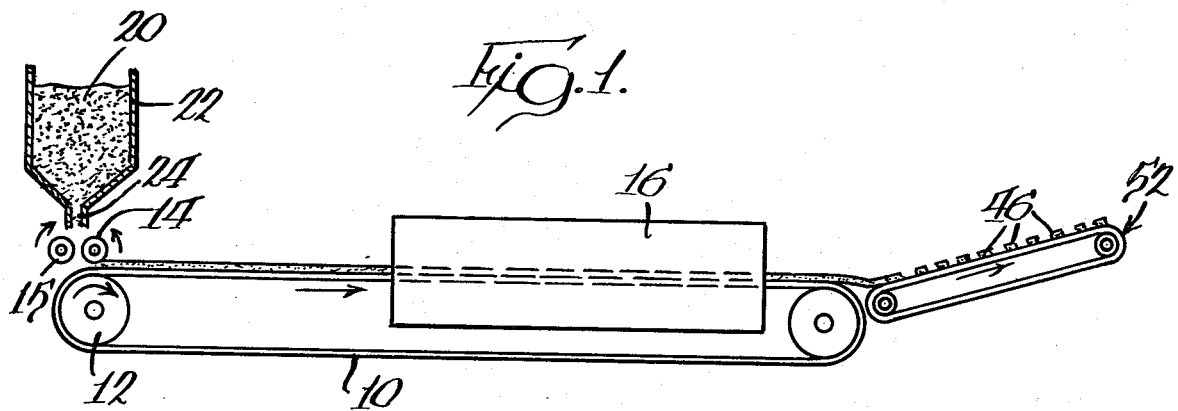
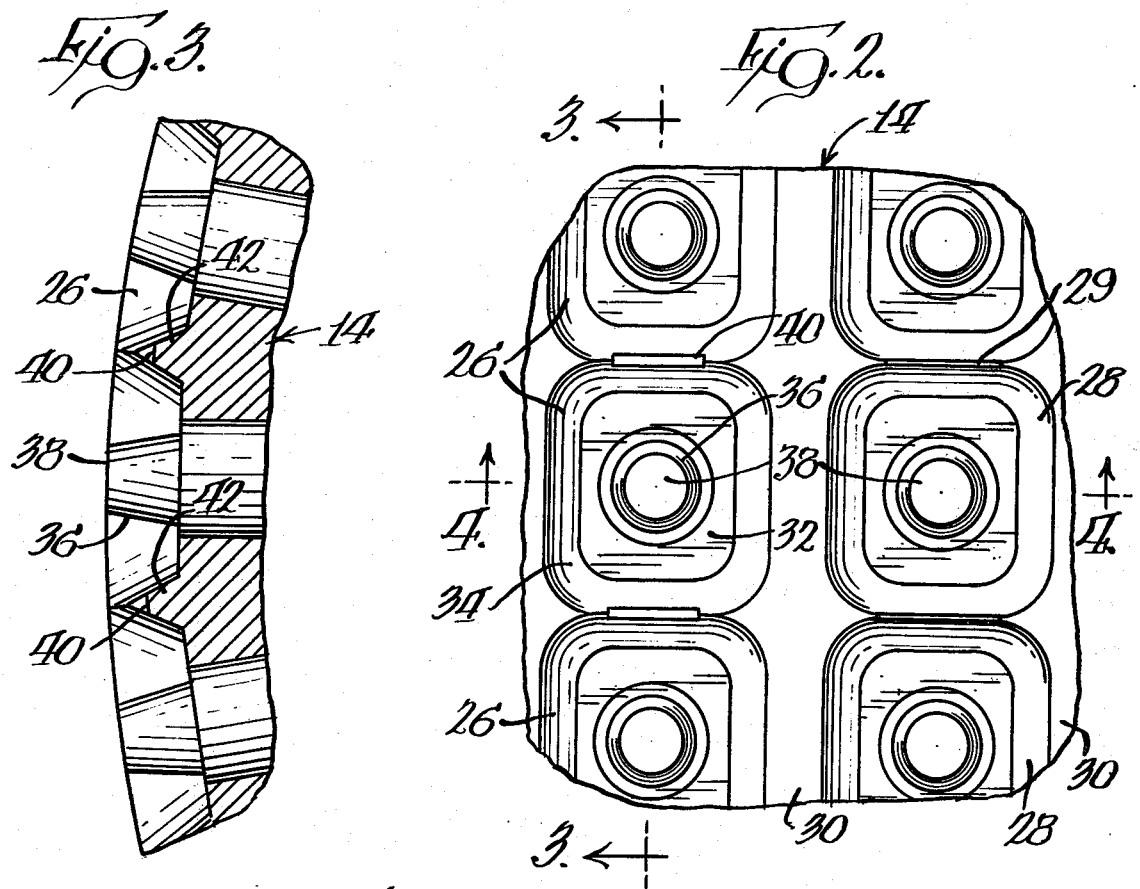
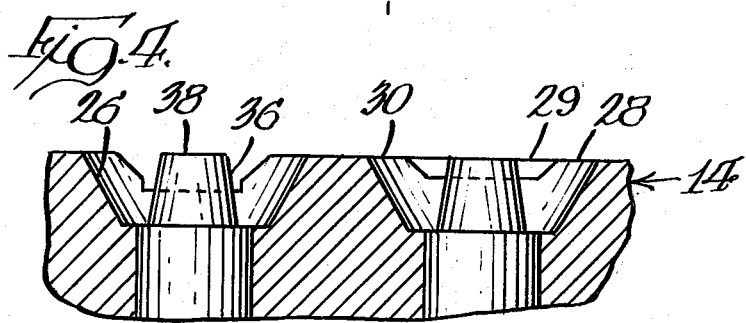

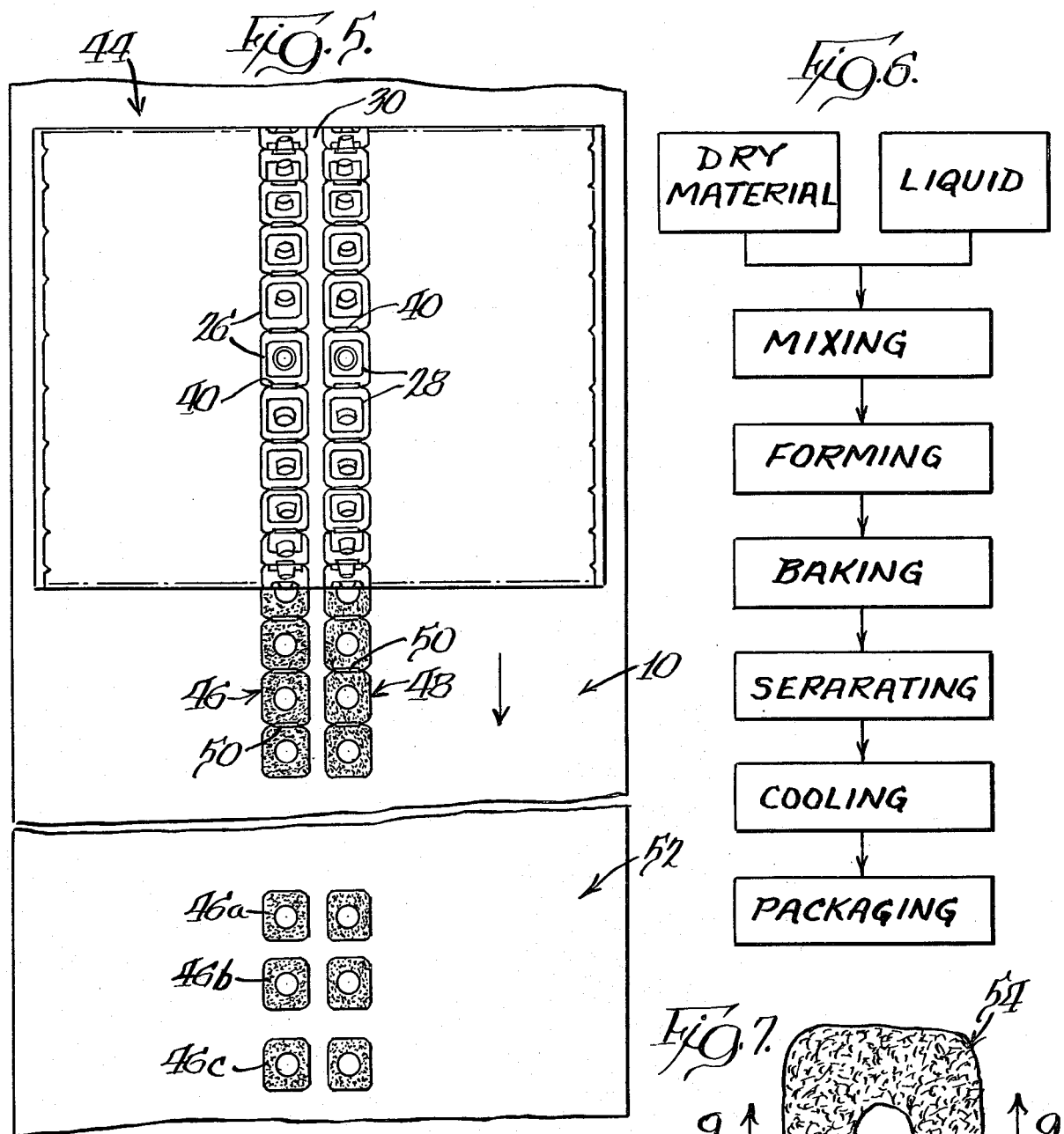

METHOD OF MAKING A READY-TO-EAT BREAKFAST CEREAL

BACKGROUND OF THE INVENTION

This invention relates to a ready-to-eat breakfast cereal product and to a method for making such product.

The art of preparing breakfast cereals has evolved into a number of well established, specialized practices over the past seventy years. Generally, so-called "cold" ready-to-eat breakfast cereal products are prepared by modifying cereal grains into an edible form that is substantially crisp and can be eaten as such or with milk without becoming soggy within a short period of time.

Virtually all methods for making ready-to-eat cereals have remained substantially unchanged since the development of the original processes. The basic processes include puffing, flaking, shredding and extrusion of cereal grains or cereal dough, each of which results in products having well established shapes, sizes and compositions. Although numerous improvements have been made to these basic processes, it would be desirable to provide a new process for manufacturing ready-to-eat breakfast cereals, especially one from which a variety of unique and distinctive products and product shapes can be obtained. Ideally, such a new process should be capable of being undertaken without substantial capital expenditures and should offer significant operational efficiencies.

SUMMARY OF THE INVENTION

In accordance with the present invention, a unique ready-to-eat breakfast cereal is prepared from a combination of heterogeneous ingredients. A primary ingredient is a coarse particulate vegetable component, preferably a fiber-containing component such as bran, which is mixed with moist edible binders other than flour to form a heterogeneous moldable mass. The mass is then shaped into a plurality of pieces by die molding, which is a shaping method unique to the breakfast cereal industry. The shaped pieces are then dried, whereby the particulate or fibrous vegetable component forms a crisp, void-containing matrix that is substantially coated with and held together by the binder.

The moist mixture is preferably formed into pieces on a rotary die molding apparatus of the general type employed for making homogeneous, flour-containing, heavily-shortened cookies, comprising a cavity-bearing roll in engagement with the surface of a conveyor. The moist mixture is directed between the roll and conveyor, and the product pieces are formed in the cavities and are deposited upon or adhere to a conveyor, whereby they are easily transported through a drier, then cooled, and subsequently collected and packaged.

A typical preferred product formulation will comprise precooked bran particles within a certain size range, and a binder system composed of sugar components and shortening. A particular combination of product ingredients and moisture is required to successfully form the mixture by die molding, as will be hereinafter explained.

Any ingredients used in the molding process that require cooking are precooked, in order to avoid high temperature or long duration baking, and to facilitate die molding. As a result, the pieces are merely dried to product a crisp delicate structure wherein the bran particles form a void-containing matrix that is substantially coated with, or encapsulated by, and held together by the binder system. The resulting product has a crisp texture, low liquid absorption rate, and other unique eating qualities associated with breakfast cereals, and the pieces have a uniform appearance and are of a size convenient to be eaten with a spoon. Furthermore, the product can be processed into a variety of sizes and shapes and is not limited to sizes and shapes associated with traditional processes.

The cereal components used in the product of the present invention are in the form of coarse particles rather than powdered in order to form a heterogeneous, interconnected, porous matrix upon drying. The product is therfore substantially free of any flour such as wheat flour, the presence of which would adversely affect the desired properties of the product.

THE DRAWINGS

FIG. 1 is a schematic side view of apparatus suitable for carrying out the process of the present invention.

FIG. 2 is a fragmentary circumferential view of a die forming roll suitable for carrying out the process of the present invention.

FIG. 3 is a fragmentary sectional view of the roll of FIG. 2, taken along section line 3—3 thereof.

FIG. 4 is a fragmentary axial sectional view of the die forming roll, taken along line 4—4 of FIG. 2.

FIG. 5 is a fragmentary plan view of a portion of the die forming roll and conveyor, illustrating the formation of the product on the conveyor.

FIG. 6 is a flow diagram illustrating the overall process utilized in the present invention.

FIG. 7 is a plan view of a representative product of the present invention.

FIG. 8 is a side view of the product of FIG. 7, and further illustrating several pieces of the product linked together.

FIG. 9 is a sectional view taken along line 9—9 of FIG. 7.

DESCRIPTION OF THE PREFERRED EMBODIMENTS

In accordance with the present invention, a unique ready-to-eat cereal product is provided and is uniquely suitable for being formed into pieces by a die molding apparatus, preferably a rotary die molding apparatus.

Although rotary die molding apparatus is known per se, there is no suggestion in the prior art to use such apparatus for the manufacture of products having the distinct properties and characteristics of ready-to-eat cereal products, particularly a product that does not contain substantial quantities of wheat flour to provide a homogeneous cohesive dough. Die molded food products such as cookies are formed primarily of heavily shortened wheat flour dough and are typically soft, homogeneous and highly absorbent. The ready-to-eat breakfast cereal described herein, on the other hand, is a heterogeneous mixture of edible components, including relatively coarse vegetable particles held together by a sugar binder or binder system, and having a crisp, delicate structure. The product is furthermore free of flour but is nevertheless capable of being formed continuously into a plurality of pieces by a rotary die molding process.

The vegetable particles within the product preferably contain a substantial quantity of fiber. One excellent source of fiber and the preferred fiber component of this invention is bran, including wheat bran, corn bran, soya bran, rice bran and oat hulls. In order to form the suitable crisp matrix herein described, the vegetable particles should not be ground or powdered, but rather should comprise particles falling within a size range, as determined by standard screen analysis, of from about 0.015 to about 0.15 inches. If precooked bran is used, the average particle size should fall within the range of from about 0.015 to about 0.075 inches. It will be understood that any edible vegetable component having a significant amount of fiber, such as nut skins, also may be used.

The product contains from about 20 to about 65 percent coarse particulate vegetable components. If the product contains bran, the preferred range of vegetable components is from about 30 to about 65 percent, with a minimum of at least about 15 percent of the total composition consisting of bran. Other particulate cereal components may be used in combination with the bran to further modify taste and texture, such as cereal flakes, including flaked wheat, rolled oats and flaked corn.

The bran and other cereal components are preferably precooked so as to avoid the necessity of subjecting the final product to high temperature or heating for prolonged periods of time. Precooking of the bran has also been found to significantly improve the taste and texture of the product. The bran may be precooked, with flavoring components such as sugar and malt, with steam at a positive pressure and at a temperature of below 250° F. for a period of from about 15 to about 45 minutes, followed by drying.

The particulate vegetable materials used in the product are mixed with water, a binder system, and optional flavoring ingredients to produce a mixture that may be molded into shape-retaining bodies, as herein described. The preferred binder is sugar, defined herein to include mono- and disaccharides, including compound sugars such as sucrose and maltose, as well as simple sugars, such as dextrose, levulose and mixtures thereof, and further including particular types such as invert and corn syrups, molasses, brown sugar, maple sugar, honey and the like.

In order to provide sufficient binder to allow the product to be die molded, the final, dry product contains at least about 15 percent sugar components by weight and may contain up to about 40 percent sugar components.

The product contains from about 5 to about 25 percent shortening and preferably from about 8 to about 18 percent shortening. The term "shortening" as used herein includes solid and liquid fatty substances derived from vegetable and animal sources. Particularly suitable is coconut oil, although other vegetable oils may be used, such as oils derived from sources including corn, peanut, cotton, soy, palm, and the like. The presence of the shortening in the binder system serves to somewhat soften the sugar components upon being dried therewith. The shortening also facilitates release of the product from the die during shaping.

As optional ingredients, the product may contain additives that contribute primarily to flavor. Particularly suitable additives are up to about 5 percent each of coconut and malt syrup.

In order to improve the nutritional qualities, vitamins and minerals may be incorporated into the product mixture. The product may also contain stabilizers and may contain up to about 3 percent of a gas evolving leavening agent such as sodium bicarbonate, which assists in the formation of pores in the product upon heating during drying.

Referring first to FIG. 6 of the drawings, the aforesaid ingredients are first mixed with sufficient water to form a moist mass that may be processed on a rotary die molding apparatus. The proportion of moisture in the mixture to be formed is very important, since too much or too little moisture will not allow the mixture to be shaped or to be shape-retaining and excess moisture also will cause the mixture to become too sticky to be processed. The amount of moisture should be within the range of from about 10 to about 35 percent by weight, based on the total weight of the ingredients.

The ingredients and water are thoroughly mixed to assure coating of the sugar and shortening binder onto the vegetable particles, the mixture is then ready to be formed into individual bodies or pieces by a die molding process. At this stage, the combination of ingredients is a moist, heterogeneous mixture which has little if any corollary in the production of foods for human consumption. In any event, the mixture cannot be characterized as a dough, nor is it even dough-like. Nevertheless, when prepared as described above, the mixture is capable of being shaped by a die molding process.

For the purposes of the present invention, a die molding process is one wherein the moist mixture is loosely compacted into a cavity and is then deposited or removed from the cavity, whereby a major area of the product conforms to the shape of the cavity. In a rotary die molding process as described herein the mixture is compacted between a moving conveyor bed and a rotating cavity-bearing roll, and the formed product is released from the cavity onto the conveyor in a continuous fashion. The product will thus have a shaped upper surface as defined by the contour of the cavity and a flat bottom surface defined by the conveyor bed.

As shown in FIG. 1, the process of the present invention may utilize moving flat bed conveyor means, such as an endless horizontal canvas conveyor belt 10 wrapped around horizontally spaced rolls 12 and driven by suitable motor or driving means (not shown) in the direction indicated by the arrow. The upper horizontal surface of the conveyor belt 10 is utilized in the movement of the product away from a die forming roll 14 and in the conveyance of the formed product through a conventional oven 16 spaced downstream from the die forming roll.

The product mixture, in the form of a moist, moldable or shape-retaining mass 20 is supplied from the outlet 24 of a hopper 22 feeding downwardly between the nip of the die forming roll 14 and a parallel compacting roll 15. The rolls 14 and 15 are rotated in the directions indicated by the respective arrows such that the product mixture entirely fills and is loosely compacted into the dies or cavities of the roll 14.

The die forming roll 14 is shown in detail in FIGS. 2, 3 and 4. The roll 14 is cylindrical and is driven about its axis in conjunction with roll 15 in the formation of the product. The roll 14 includes a plurality of axially spaced lines of dies or cavities extending beneath the cylindrical surface, such as 26 and 28, said lines extending around the circumference of the roll, the center points of each line 26 and 28 defining a line or circle around the roll axis. The cavities may be formed in the outer cylindrical metal surface 30 of the roll by machining. It will be noted the lines of the cavities 26 and 28 are preferably parallel. Also the cavities in respective rows are shown arranged in parallel for the sake of convenience, as shown along line 4—4 in FIG. 3, but such arrangement may be varied if desired.

Although only a pair of cavity lines 26 and 28 are shown in the drawings, it will be appreciated that the roll 14 may carry a large number of lines of cavities, for example, in excess of forty, depending upon desired product size and roll width.

In the embodiment shown, the shape of the cavity 26 or 28 is square or rectangular, although other regular and irregular shapes, such as triangular and other multiple-sided forms, as well as round and oval, and variations thereof, may be employed. If the shape comprises corners, it is preferred that the corners are rounded as shown to minimize product sticking.

Each cavity 26 or 28 comprises a flat base portion 32 surrounded by an outwardly sloping or diverging side wall or walls 34. A pin 36 may be provided in each cavity, said pin being spaced from the side wall 34 and having a curved or cylindrical end surface 38 flush or level with the outer cylindrical surface 30 of the roll. The purpose of the pin 36 is to provide a hole in each of the formed pieces, and the pin is preferably tapered from the cavity base 32 to facilitate release of the formed product.

It will be appreciated that although the die or cavity shape described above is preferred, any concave cavity shape may be used that employs outwardly sloping surfaces to insure product release. As an example, the cavity could employ curved base and side portions, depending upon the desired shape of the product formed thereby.

As shown in FIGS. 2 and 4, the line of cavities, such as 28, may comprise individual cavities which are spaced circumferentially from each other in each line, such cavities being separated by transverse webs 29 therebetween, whereby individual and separate product pieces are formed by the die forming roll.

In the alternative, in order to facilitate release of the formed product from the dies, the cavities in a line, such as 26, may have interconnecting recessed channels 40 between adjacent cavities in each line. In this embodiment, the adjacent cavities are separated by a tapered axial web 42 (FIG. 3), and a terminal portion of the web is recessed from the surface of the roll to provide an interconnection channel between the adjacent cavities. The height of the recessed portion of the web is less than the height of the cavity and is advantageously in the order of about 20 to 65 percent of the cavity height. The interconnecting channels 40 cause a linking segment to be formed between the opposing sides of adjacent product pieces as they are being formed, such that the pieces are formed together in a continuous chain as they exit from the cavities.

FIG. 5 further illustrates the combination of the forming roll 14 and conveyor belt 10 in operation, and both lines 26 and 28 have been shown with interconnecting channels 40 to facilitate the following description. The mixture to be formed is introduced to the rear side of the roll 14, as indicated by the arrow at 44, whereupon the mixture is compressed between the cavity bearing roll 14 and a secondary roll 15 and fills the cavities 26, 28 and channels 40. Adjacent lines 26 and 28 are separated by a band of the outer cylindrical surface 30 of the roll, which surface fully engages the belt 10 and substantially excludes deposit of material or briding between said lines. In this manner, continuous individual strings or chains such as 46 and 48, of die molded material are deposited and travel on the conveyor bed 10, said strings being deposited in parallel with the direction of movement of the conveyor.

The product chain 46 is further illustrated in FIG. 8. It will be noted that the chain comprises individually formed pieces 46a, 46b, and 46c, adjacent ones of which are linked together by a web 50 that is relatively thin in comparison to the thickness of the product pieces 46.

It will be appreciated that the formation of the product as continuous chains, such as 46 and 48 shown in FIG. 5 facilitates the release of the shaped product from the die roll, due to the continuity of the chain, and this feature may advantageously be used if product sticking is encountered. Otherwise, however, it is preferred to use a roll having individual cavities so that the pieces will be formed and released separately, thus avoiding the extra step of separating the chain into individual pieces.

Whether the product is formed as individual bodies or as chains, it may be seen that rotary die molding of a ready-to-eat cereal product offers several distinct advantages. The process is continuous and allows the rapid formation of a large number of uniformly shaped, bite-sized pieces on a single conveyor belt. The pieces tend to adhere to the belt until baked, thus allowing the pieces to be formed in a compact uniform arrangement.

Referring to FIGS. 1, 5 and 6, after the pieces or chains have been formed, they are immediately transferred via the conveyor 10 through an oven 16 where they are gently dried to a moisture content of less than 7 percent by weight.

If the product is in the form of continuous chains such as shown in FIG. 8, such chains may be separated at the webs 50 between the individual pieces such as 46a, 46b and 46c. This separation is preferably carried out after drying and before the product has cooled to ambient temperature. A convenient method of separation is to convey the strings from the first conveyor 10 to a second conveyor 52 traveling at a somewhat higher speed than the first. The second conveyor 52 may also be tilted upward relative to the main conveyor 10 to bend and assist in breaking the thin webs 50 between adjacent pieces. The retained heat in the food also facilitates product separation.

The product pieces are then allowed to cool and may be packaged by conventional methods. The final product, illustrated generally at 54 in FIGS. 7 and 9, is square or rectangular in shape, has a central tapered opening 56, and outwardly sloping side walls 58, all of which correspond to the shape of the cavities in the forming roll. The central opening 56 in the product is functional in that it facilitates baking and uniform drying of the product in the oven. Due to the nature of the process, the bottom surface 59 of the product is flat. Desirably, the size of the product does not exceed one inch in any dimension.

The final product 54, upon drying to a moisture content of less than 7 percent comprises the particulate vegetable or cereal components that are coated and adhered together by the binder comprising the sugar components and shortening. Due to the nature of the forming process and the nature and particulate size of cereal components, the cereal is not densely packed together but is in the form of a porous, void-containing matrix that is crisp and tender. The presence of the binder coating on the individual cereal particles also apparently decreases the tendency of the cereal to easily absorb liquid, such that the product tends to remain crisp when eaten with milk.

As an example of a particular product of the present invention, the product, for example, could be formulated to contain the following on a dry basis: precooked bran, from 30 to 38 percent; oat flakes, from 14 to 22 percent; brown sugar, from 12 to 20 percent; coconut oil, from 9 to 14 percent; sucrose, from 3 to 17 percent; malt syrup, from 1 to 5 percent; corn syrup, from 0.5 to 5 percent; coconut, from 0.5 to 5 percent; and sodium bicarbonate, from 0.25 to 1.5 percent.

The following example is given as being illustrative of, without being limited to, various formulations of die molded ready-to-eat breakfast cereal products of the present invention.

EXAMPLE

| Ingredients | 1 | 2 | 3 | 4 | 5 | 6 | 7 | 8 | 9 | 10 | 11 | 12 |
|---|---|---|---|---|---|---|---|---|---|---|---|---|
| Dry Weight Percentage | | | | | | | | | | | | |
| Precooked Vegetable Fiber | | | | | | | | | | | | |
| Wheat | 65 | | | 20 | | | 15 | 30 | 20 | | 20 | |
| Corn | | 65 | | 40 | | 15 | 15 | | | 30 | | |
| Nut Skins | | | 65 | | 15 | | 15 | | | | | |
| Cereal Flakes | | | | | | | | | | | | |
| Oat | | | | 40 | | | | | | | 10 | |
| Wheat | | | | | 15 | | 35 | | | 30 | 10 | |
| Corn | | | | | | 40 | | | | | 10 | |
| Shortening | | | | | | | | | | | | |
| Coconut Oil | 10 | | | 15 | | | 5 | | 25 | | 25 | 25 |
| Peanut Oil | | 10 | | 12 | | | 25 | | 20 | | | |
| Corn Oil | | | 10 | | 20 | | | | | | | |
| Sugar Components | | | | | | | | | | | | |
| Sucrose | 15 | | 10 | | 35 | | | 20 | 10 | 5 | 10 | |
| Honey | | | 10 | | | | | | | 15 | 5 | |
| Corn Syrup | | | | 10 | 5 | | | | | | | |
| Brown Sugar | | 15 | | | 3 | | 40 | 30 | 20 | | 5 | 25 |
| Molasses | | 5 | | | 10 | | | | | | | 5 |
| Other | | | | | | | | | | | | |
| Coconut | 4 | 5 | | | | | | | | | | 5 |
| Nuts | 2 | 5 | 5 | 3 | | | 2 | | 5 | 3 | | 5 |
| Malt Syrup | 3 | .5 | | 5 | | | | | | 2 | | 4 |
| Sodium Bicarbonate | 1 | | 2 | | | 3 | | | | | | 1 |

We claim:

1. A method for making a ready-to-eat breakfast cereal product comprising the steps of first preparing a moldable, shape-retaining heterogeneous mixture comprising from about 20% to about 65% coarse particulate cereal components, sugar components in an amount sufficient to permit die molding of said mixture and from about 10% to about 35% moisture based on the total weight of the mixture, loosely compacting said mixture into a plurality of moist pieces on a cavity bearing roll, and then drying said pieces to a moisture content below 7% to produce a crisp, structure containing the particulate components adhered together by said sugar components.

2. Method for making a ready-to-eat breakfast cereal product comprising the steps of preparing a mixture comprising, on a dry basis, from about 20% to about 65% particulate vegetable components selected from the group consisting of precooked bran, cereal flakes and mixtures thereof, from about 5% to about 25% vegetable oil and at least 15% and up to about 40% sugar components, said mixture being substantially free of flour, admixing said mixture with from about 10% to about 35% moisture based on the total weight of said mixture until the vegetable components are coated by said sugar components and shortening, forming said mixture into a plurality of bite-sized pieces on a cavity-bearing roll, and then drying said pieces to a moisture content of less than 7% to produce a crisp matrix of said vegetable components coated and adhered together by said sugar components and shortening.

3. The method of claim 2 wherein said pieces are formed as individual, separate bodies.

4. The method of claim 2 wherein said pieces are formed as an interconnected chain of bodies connected together by relatively thin webs to facilitate release of the bodies from the cavity-bearing roll.

5. Process for preparing a ready-to-eat breakfast cereal product comprising the steps of preparing a moist mixture containing coarse particulate cereal components, from about 10 to about 35% water, and sugar in an amount sufficient to permit die molding of said mixture, loosely compacting and forming said mixture on a rotating cavity-bearing die forming roll to produce a continuous string of the formed moist mixture having a plurality of bodies connected together by relatively thin webs, and thereafter drying and separating the bodies at the webs to produce individual crisp pieces.

6. The process of claim 5 wherein said continuous string is passed through a drying oven and heated prior to separation.

7. The process of claim 6 wherein said continuous string is removed from said oven and separated before said product has cooled to ambient.

8. The process of claim 5 wherein a plurality of closely spaced continuous strings are produced simultaneously on said conveyor.

9. The process of claim 5 wherein an opening is formed through said bodies during the formation thereof.

10. The process of claim 5 wherein the bodies are rectangular shape, with facing sides thereof being connected by said web.

11. The process of claim 7 wherein said mixture comprises from about 20 to about 65 percent particulate cereal components.

12. The product obtained by the process of claim 2.

* * * * *

UNITED STATES PATENT OFFICE
CERTIFICATE OF CORRECTION

PATENT NO. : 4,178,392

DATED : December 11, 1979

INVENTOR(S) : Harold G. Gobble, Richard M. Vondell, Raymond Mooi, Ronald D. Bos, Gordon L. Bordewyk and Kenneth N. Blackford It is certified that error appears in the above-identified patent and that said Letters Patent are hereby corrected as shown below:

The "Inventor" portion should read: --Harold G. Gobble, Johnstown Township, Barry County; Richard M. Vondell, Battle Creek; Raymond Mooi, Wyoming; Ronald D. Bos, Byron Center; Gordon L. Bordewyk, East Grand Rapids; Kenneth N. Blackford, Wyoming, all of Michigan.--.

Signed and Sealed this

First Day of April 1980

[SEAL]

Attest:

SIDNEY A. DIAMOND

Attesting Officer — Commissioner of Patents and Trademarks